(12) United States Patent
Roozenboom et al.

(10) Patent No.: US 7,490,462 B2
(45) Date of Patent: Feb. 17, 2009

(54) TURBOCHARGED EXHAUST GAS RECIRCULATION SYSTEM

(75) Inventors: Stephan Donald Roozenboom, Washington, IL (US); Andrew John Kieser, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 109 days.

(21) Appl. No.: 11/357,160

(22) Filed: Feb. 21, 2006

(65) Prior Publication Data
US 2007/0193270 A1     Aug. 23, 2007

(51) Int. Cl.
F02M 25/06 (2006.01)
(52) U.S. Cl. .............................. 60/278; 60/274; 60/280; 60/286; 60/295; 60/605.2; 60/612; 123/562
(58) Field of Classification Search .................. 60/274, 60/278, 280, 285, 295, 301, 605.2, 612, 286; 123/562
See application file for complete search history.

(56) References Cited

U.S. PATENT DOCUMENTS

| | | | |
|---|---|---|---|
| 5,657,625 A | 8/1997 | Koga et al. | |
| 5,714,130 A | 2/1998 | Saito et al. | |
| 5,746,052 A | 5/1998 | Kinugasa et al. | |
| 5,794,445 A | 8/1998 | Dungner | |
| 5,964,088 A | 10/1999 | Kinugasa et al. | |
| 6,009,709 A | 1/2000 | Bailey | |
| 6,023,929 A | 2/2000 | Ma | |
| 6,047,542 A | 4/2000 | Kinugasa et al. | |
| 6,109,024 A | 8/2000 | Kinugasa et al. | |
| 6,119,452 A | 9/2000 | Kinugasa et al. | |
| 6,122,910 A | 9/2000 | Hoshi et al. | |
| 6,128,898 A | 10/2000 | Sakurai et al. | |
| 6,133,185 A | 10/2000 | Kinugasa et al. | |
| 6,151,890 A | 11/2000 | Hoshi | |
| 6,176,079 B1 | 1/2001 | Konrad et al. | |
| 6,237,335 B1 | 5/2001 | Lönnqvist | |
| 6,289,672 B1 | 9/2001 | Katoh et al. | |
| 6,321,537 B1 | 11/2001 | Coleman et al. | |
| 6,334,986 B2 | 1/2002 | Gieshoff et al. | |
| 6,338,244 B1 | 1/2002 | Guenther et al. | |
| 6,345,496 B1 | 2/2002 | Fuwa et al. | |
| 6,360,732 B1 | 3/2002 | Bailey et al. | |
| 6,397,598 B1 | 6/2002 | Pierpont | |
| 6,406,818 B1 | 6/2002 | Ide | |
| 6,412,279 B1 | 7/2002 | Coleman et al. | |
| 6,415,600 B1 | 7/2002 | Lejon | |

(Continued)

FOREIGN PATENT DOCUMENTS

JP       409004441     *   1/1997   ................. 60/286

(Continued)

*Primary Examiner*—Binh Q. Tran
(74) *Attorney, Agent, or Firm*—Finnegan, Henderson, Farabow, Garrett & Dunner (57) ABSTRACT

An exhaust recirculation system includes a power source including at least one cylinder outputting exhaust gas and a particulate reducing device fluidly connected to at least one exhaust duct of the power source. The particulate reducing device is configured to reduce an amount of particulates in the exhaust gas. The exhaust recirculation system also includes a recirculation compressor configured to receive and compress at least a portion of the exhaust gas. An intake duct of the at least one cylinder of the power source is fluidly connected to the recirculation compressor to receive the compressed reduced-particulate exhaust gas.

30 Claims, 3 Drawing Sheets

U.S. PATENT DOCUMENTS

| | | |
|---|---|---|
| 6,418,721 B1 | 7/2002 | Coleman et al. |
| 6,484,499 B2 * | 11/2002 | Coleman et al. ............... 60/612 |
| 6,484,500 B1 | 11/2002 | Coleman et al. |
| 6,543,230 B1 | 4/2003 | Schmid |
| 6,662,552 B1 | 12/2003 | Gunther et al. |
| 6,715,289 B2 | 4/2004 | Mader et al. |
| 6,732,507 B1 | 5/2004 | Stanglmaier et al. |
| 6,739,125 B1 | 5/2004 | Mulligan |
| 6,851,414 B2 * | 2/2005 | Gao et al. ............... 123/568.12 |
| 6,951,098 B2 | 10/2005 | Xu et al. |
| 6,981,370 B2 * | 1/2006 | Opris et al. ................... 60/311 |
| 6,981,375 B2 * | 1/2006 | Sisken et al. ................. 60/612 |
| 7,013,879 B2 * | 3/2006 | Brookshire et al. .... 123/568.12 |
| 7,043,914 B2 * | 5/2006 | Ishikawa ................... 60/605.2 |
| 7,107,761 B2 * | 9/2006 | Fukuma et al. ................ 60/285 |
| 7,107,764 B1 * | 9/2006 | Opris et al. .................... 60/297 |
| 7,159,393 B2 * | 1/2007 | Blomquist et al. ............ 60/302 |
| 7,168,250 B2 * | 1/2007 | Wei et al. ................... 60/605.2 |
| 2004/0076565 A1 | 4/2004 | Gandhi et al. |
| 2005/0229900 A1 | 10/2005 | Weber et al. |
| 2006/0096275 A1 | 5/2006 | Robel et al. |

FOREIGN PATENT DOCUMENTS

| | | |
|---|---|---|
| JP | H09-4441 | 1/1997 |

* cited by examiner

TURBOCHARGED EXHAUST GAS RECIRCULATION SYSTEM

TECHNICAL FIELD

The present disclosure relates generally to an exhaust gas recirculation system, and more particularly, to a turbocharged exhaust gas recirculation system for an engine.

BACKGROUND

Engines, including diesel engines, gasoline engines, gaseous fuel-driven engines, and other engines known in the art, may exhaust a complex mixture of air pollutants. The air pollutants may be composed of gaseous and solid material, including particulate matter, nitrogen oxides (NOx), and sulfur compounds.

Due to heightened environmental concerns, exhaust emission standards have become increasingly stringent over the years. The amount of pollutants emitted from an engine may be regulated depending on the type, size, and/or class of engine.

One method that has been implemented by engine manufacturers to comply with the regulation of engine emissions includes introducing a catalyst in the exhaust stream. Some catalysts are capable of removing pollutants from the exhaust gas by chemical reaction. For example, some catalysts provide a catalytic reduction of NOx in the exhaust gas by reacting NOx with ammonia, which is injected into the exhaust gas stream upstream from the catalyst. Therefore, ammonia or urea, which may be converted into ammonia, must be stored and used when needed for catalytic reduction of NOx. The storage of such chemicals is costly, requires constant replenishment, and may require specialized storage equipment. Further, storage of ammonia is hazardous because of its high reactivity.

Another method that has been implemented by engine manufacturers to comply with engine emissions regulations is exhaust gas recirculation ("EGR"). EGR systems recirculate engine exhaust gas into the intake air supply of the engine. The exhaust gas directed to the engine cylinder reduces the concentration of oxygen within the cylinder and increases the specific heat of the air/fuel mixture, thereby lowering the maximum combustion temperature within the cylinder. The lowered maximum combustion temperature and reduced oxygen concentration can slow the chemical reaction of the combustion process and decrease the formation of NOx.

For example, an EGR system is described in U.S. Pat. No. 5,794,445 ("the '445 patent") to Dungner. The '445 patent describes an EGR system in which a portion of exhaust gas from a first cylinder group is used to drive an EGR turbine and a portion of the exhaust gas from a second cylinder group is compressed by an EGR compressor, which is driven by the EGR turbine. The portion of the exhaust gas that is compressed by the EGR compressor is cooled by an exhaust gas cooler downstream from the EGR compressor before being sent to an inlet side of an engine where the compressed recirculated exhaust gas combines with compressed air from a main compressor.

Although the '445 patent discloses an EGR system for decreasing NOx emissions, there is a risk of exhaust system component corrosion due to the presence of acidic sulfur by-products in the exhaust stream. The EGR system includes an exhaust gas cooler downstream from the EGR compressor. Cooling compressed exhaust gas allows the formation of sulfuric acid, and therefore, the exhaust gas cooler and any other components downstream from the exhaust gas cooler are vulnerable to corrosion.

Sulfur is a naturally occurring element in all crude oils. Heavy fuels derived from crude oil typically have higher sulfur content. Diesel fuels, for example, often contain sulfur and other substances that, at times, convert to potentially corrosive and environmentally unfriendly by-products. During combustion, sulfur is oxidized to sulfur dioxide ($SO_2$) and minute amounts of sulfur trioxide ($SO_3$). The resulting $SO_3$ reacts with water vapor to form sulfuric acid. Once the exhaust gas cools, the resulting $SO_2$ likewise reacts with water condensate to form sulfuric acid. The sulfuric acid subsequently condenses downstream in the exhaust system to produce an acidic condensate.

Acidic condensates are a major cause of engine component corrosion, secondary wear from corrosion by-products, and engine oil acidification. Additionally, high sulfur fuel and its resulting acidic condensate can affect the performance and durability of combustion engine systems and their components, such as, e.g., EGR systems, after-cooler systems (e.g., an air-to-air after-cooler ("ATAAC") and the like), turbocharger compressors, sensors, catalysts, and the like.

After-cooling involves cooling engine intake, e.g., ambient air, after compression and prior to introduction into a cylinder of the engine. After-cooling the engine intake provides an increase in engine power and lower NOx emissions. However, engine system components that include after-cooling systems positioned in the exhaust stream are vulnerable to corrosion since the exhaust stream includes substances that, when compressed, form sulfuric acid.

The disclosed system is directed to overcoming one or more of the problems set forth above.

SUMMARY OF THE INVENTION

In one aspect, the present disclosure is directed to a method for recirculating exhaust gas including operating a power source including at least one cylinder outputting exhaust gas and reducing an amount of particulates from the exhaust gas using a first aftertreatment device. The method also includes compressing at least a portion of the exhaust gas and sending the compressed reduced-particulate exhaust gas to an intake duct of the power source.

In another aspect, the present disclosure is directed to an exhaust recirculation system including a power source including at least one cylinder outputting exhaust gas and a particulate reducing device fluidly connected to at least one exhaust duct of the power source. The particulate reducing device is configured to reduce an amount of particulates in the exhaust gas. The exhaust recirculation system also includes a recirculation compressor configured to receive and compress at least a portion of the exhaust gas. An intake duct of the at least one cylinder of the power source is fluidly connected to the recirculation compressor to receive the compressed reduced-particulate exhaust gas.

In yet another aspect, the present disclosure is directed to an exhaust recirculation system including a power source having at least one first cylinder and at least one second cylinder. Each of the first and second cylinders outputs exhaust gas, and the at least one first cylinder operates under different combustion conditions than the at least one second cylinder. The first and the second cylinders have separate intake ducts and separate exhaust ducts. The exhaust recirculation device also includes an aftertreatment device that is fluidly connected to at least one exhaust duct of the power source and at least one recirculation compressor configured to receive and compress at least a portion of the exhaust gas. The intake duct of the at least one first cylinder is fluidly connected to the recirculation compressor.

DETAILED DESCRIPTION

Figure 1:
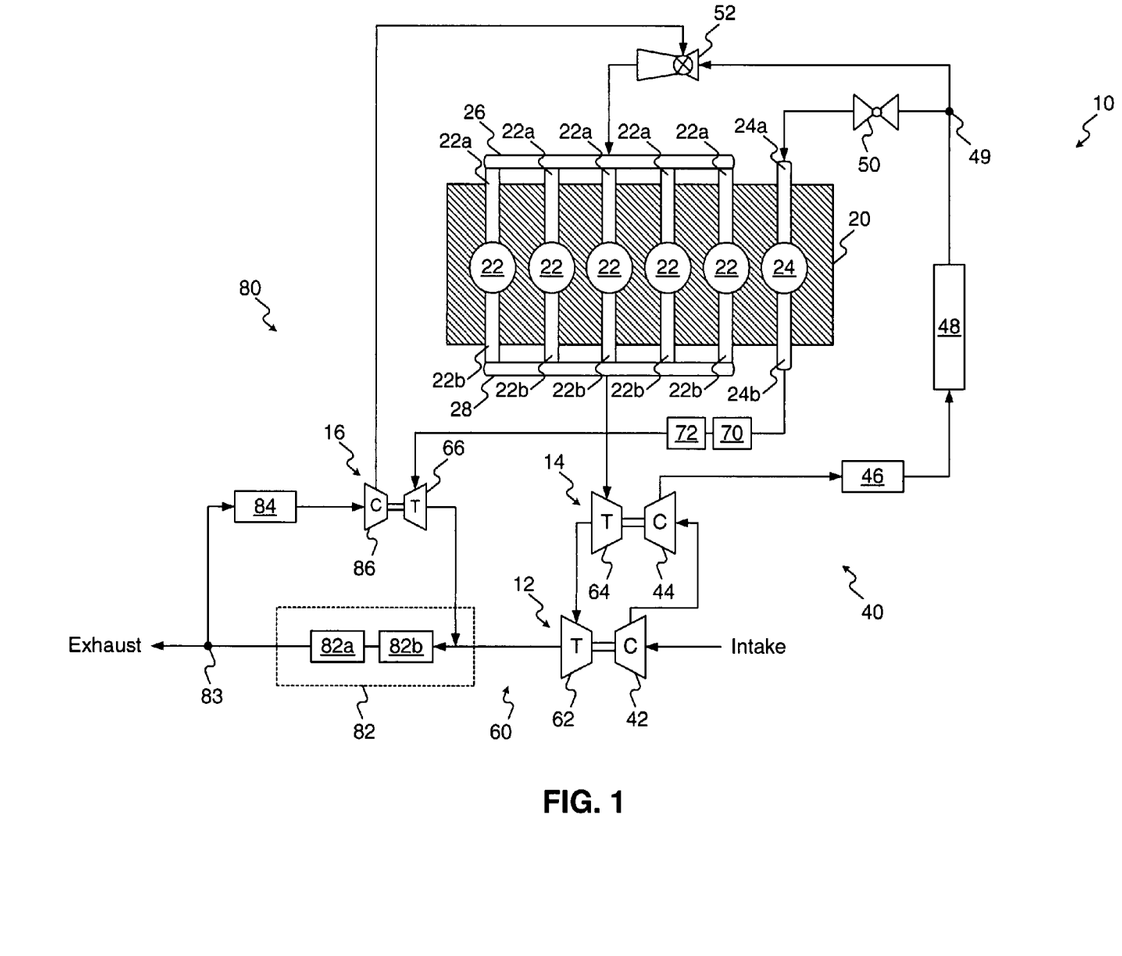
FIG. 1 is a diagrammatic illustration of an exemplary disclosed exhaust gas recirculation system.

FIG. 1 illustrates an exemplary exhaust gas recirculation ("EGR") system 10, for a powered system, such as a work machine (not shown). The exhaust recirculation system 10 includes a power source. In the exemplary exhaust recirculation system 10, the power source is an internal combustion engine 20, e.g., a diesel engine, a gasoline engine, a gaseous fuel-powered engine, and the like, or any other engine apparent to one skilled in the art. Alternatively, the engine 20 may be another source of power, such as a furnace, or another suitable source of power for a powered system, such as a factory or power plant.

The engine 20 includes a plurality of cylinders, including a first cylinder group 22 and a second cylinder group 24. Each of the cylinder groups 22, 24 includes one or more cylinders. As will be discussed in detail below, the operation of the cylinders of the cylinder groups 22, 24 depends on the ratio of air to fuel that is injected into the cylinders 22, 24 during the operation of the engine 20.

Each cylinder of the first and second cylinder groups 22, 24 includes a separate intake duct 22a, 24a and a separate exhaust duct 22b, 24b. Each of the cylinders of the first and second cylinder groups 22, 24 also includes at least one intake port (not shown) that may be opened and closed using an intake valve assembly (not shown) to receive the compressed air and/or recirculated exhaust gas, as described below, and at least one exhaust port (not shown) that may be opened and closed using an exhaust valve assembly (not shown) to output the exhaust gas.

The engine 20 may include an intake manifold 26 that receives the compressed air and/or recirculated exhaust gas and allows the compressed air and/or recirculated exhaust gas to flow to the intake ducts 22a of the first cylinder group 22. An exhaust manifold 28 may receive the exhaust gas from the exhaust ducts 22b of the first cylinder group 22. The engine 20 may also include a separate intake manifold and a separate exhaust manifold connected to the intake and exhaust ducts 24a, 24b of the second cylinder group 24.

In the exemplary embodiment, the exhaust recirculation system 10 includes an air induction system 40, a primary exhaust system 60, and a secondary exhaust system 80.

The air induction system 40 receives fresh air from, for example, an air cleaner (not shown), and supplies compressed air into the cylinders 22, 24 of the engine 20. For example, the air induction system 40 may include at least two main compressors 42, 44, at least two air coolers 46 (or 47), 48, a valve 50, and a venturi 52. It is contemplated that additional components can be included in the air induction system 40 such as, for example, additional valves, one or more air cleaners, one or more waste gates, a control system, and other configurations for introducing compressed air into the cylinders 22, 24 of the engine 20.

The exemplary air induction system 40 includes a first main compressor 42 and a second main compressor 44. The main compressors 42, 44 may be configured to compress the atmospheric air received by the air induction system 40 to a predetermined pressure level. The main compressors 42, 44 are disposed in a series relationship and fluidly connected to each other via a fluid passageway. Each of the main compressors 42, 44 may be a fixed geometry compressor, a variable geometry compressor, or any other type of compressor known in the art. It is contemplated that the first and second main compressors 42, 44 of the air induction system 40 may be replaced by a single main compressor.

Figure 2:
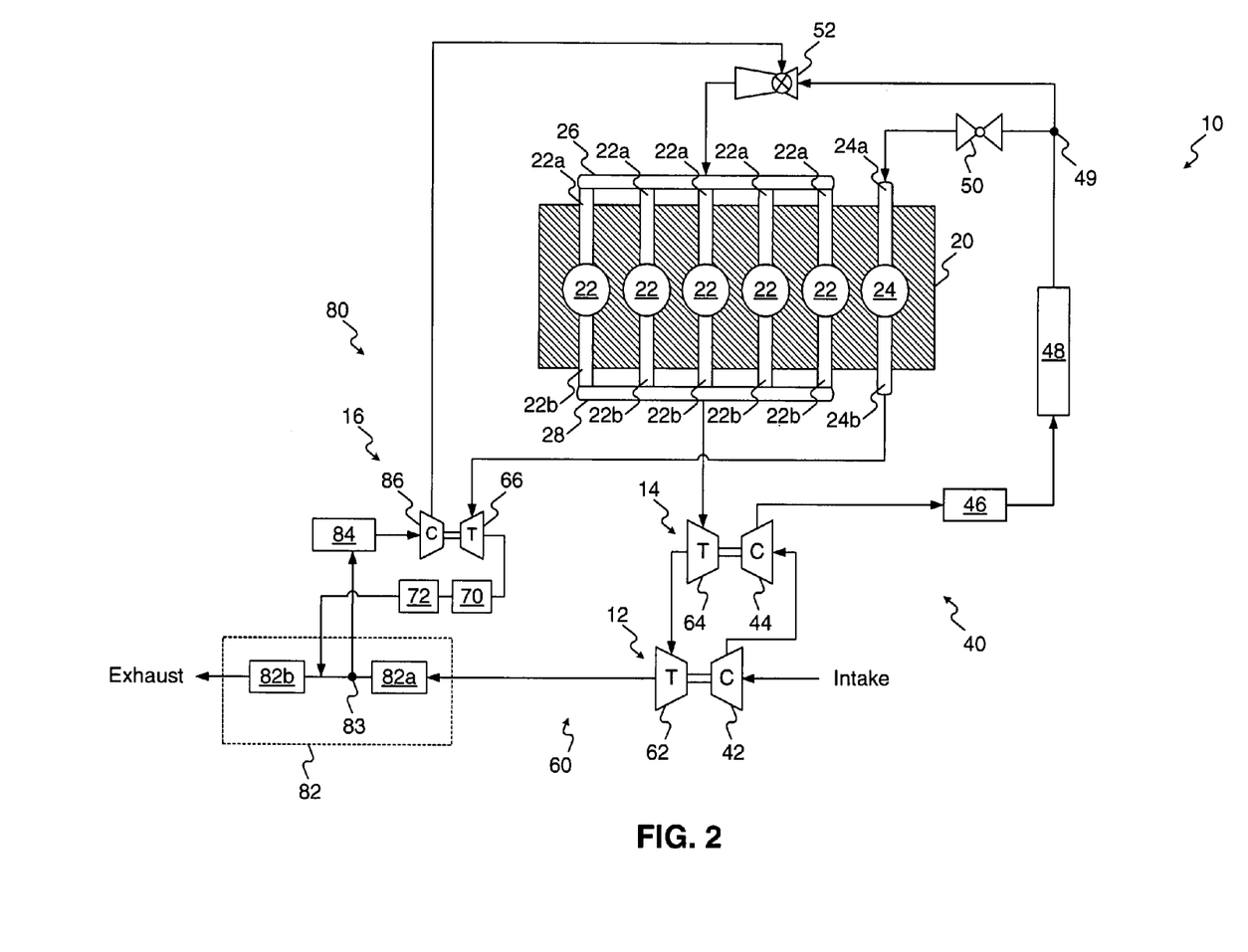
FIG. 2 is a diagrammatic illustration of another exemplary disclosed exhaust gas recirculation system.
Figure 3:
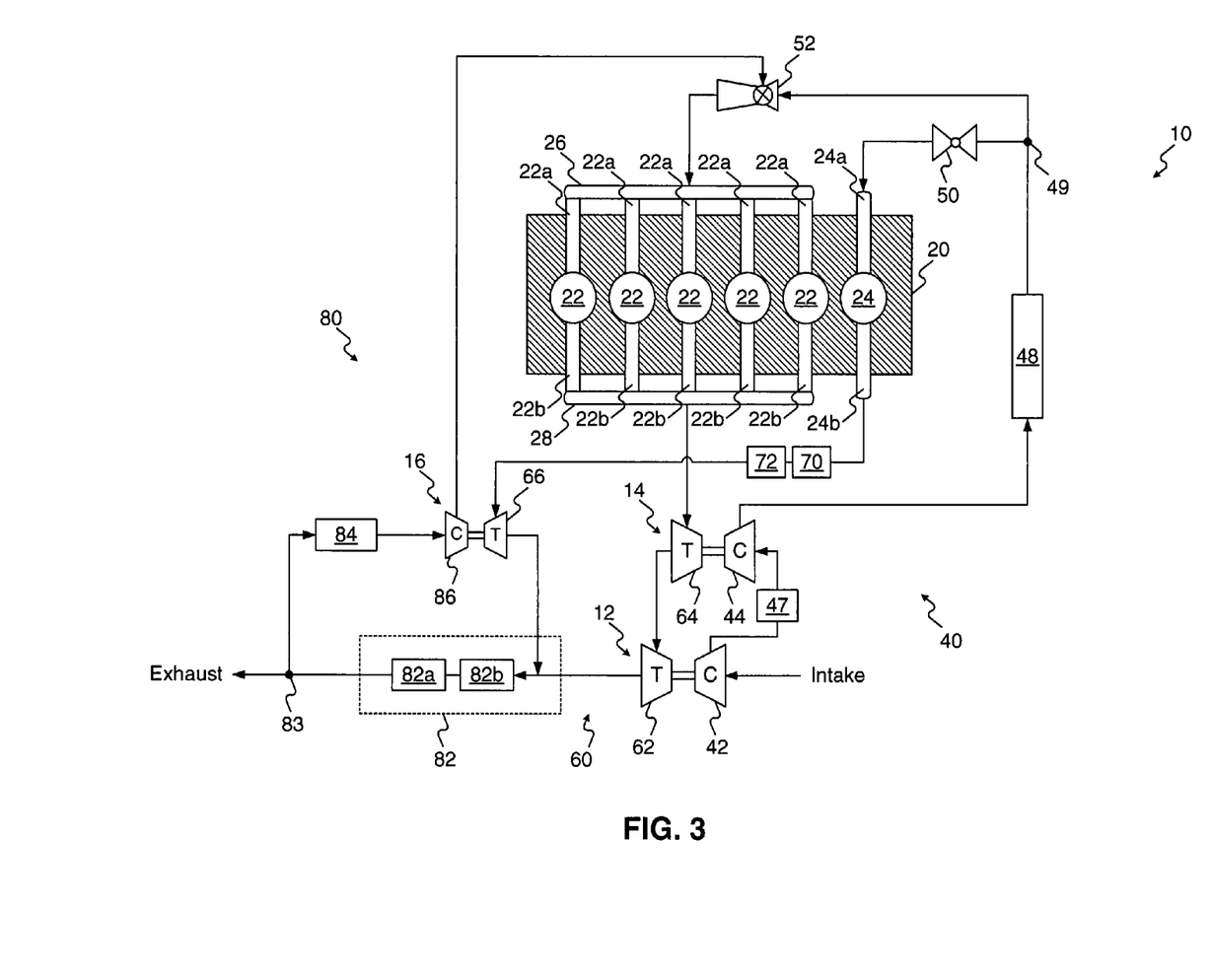
FIG. 3 is a diagrammatic illustration of a further exemplary disclosed exhaust gas recirculation system.

The air induction system 40 of the exemplary exhaust recirculation system 10 includes one or more air coolers, such as a precooler 46, an intercooler 47, and/or an after-cooler 48, e.g., an air-to-air after-cooler ("ATAAC"), as shown in the exemplary embodiments of FIGS. 1-3. In the exemplary embodiments shown in FIGS. 1 and 2, the precooler and the after-cooler 46, 48 are disposed in a series relationship and are fluidly connected to each other and to an output of the second main compressor 44 via separate fluid passageways so that the precooler and after-cooler 46, 48 cool the compressed air from an output of the second main compressor 44. In the exemplary embodiment shown in FIG. 3, the intercooler 47 is fluidly connected to the main compressors 42, 44 via separate fluid passageways so that the intercooler 47 receives the compressed air from an output of the first main compressor 42 and outputs cooled compressed air to an input of the second main compressor 44. The compressed air from the second main compressor 44 is sent to the after-cooler 48 via a fluid passageway. Each of the air coolers 46, 48 may be, for example, an air-to-air heat exchanger or an air-to-liquid heat exchanger, and may be configured to facilitate the transfer of heat to or from the air directed into the engine 20.

The after-cooler 48 is particularly useful in reducing smoke and other emissions by cooling the compressed air before it enters the intake manifold 26. Cooling the compressed intake air may help to lower combustion temperatures, thereby reducing thermal stress on the engine 20. As a result, smoke and other emissions may be reduced.

The outlet of the after-cooler 48 is connected to a port 49, which separates the flow from the after-cooler 48 into two fluid passageways. One of the fluid passageways is connected to the valve 50, e.g., a throttle valve, and the other fluid passageway is connected to the venturi 52. The valve 50 and the venturi 52 may be in communication with a control system (not shown), and the valve 50 and the venturi 52 may be selectively actuated in response to one or more predetermined conditions.

As shown in FIGS. 1-3, the intake ducts 22a, 24a of the first and second cylinder groups 22, 24 of the engine 20 receive compressed air from the air induction system 40 via separate fluid passageways. The intake duct 24a of the second cylinder group 24 is fluidly connected to the throttle valve 50 via a fluid passageway, and the intake manifold 26 of the engine 20 is fluidly connected to the venturi 52 via another fluid passageway.

The throttle valve 50 controls the flow of the compressed air to the intake duct 24a of the cylinder in second cylinder group 24 of the engine 20. For example, the throttle valve 50 may be used to regulate the intake of the compressed air to the intake duct 24a of the second cylinder group 24 when the fuel-to-air ratio in the second cylinder group 24 is too high or too low.

A control system (not shown) connected to the throttle valve 50 may be used to control the allocation of compressed air between the two fluid passageways leading to the throttle valve 50 and the venturi 52, thereby controlling the amount of compressed air supplied to the two cylinder groups 22, 24. Therefore, the control system may be used to control the respective fuel-to-air ratios in the cylinder groups 22, 24.

The venturi 52 directs the flow of the compressed air and/or recirculated exhaust gas to the intake manifold 26 that is fluidly connected to the intake ducts 22a supplying intake to the cylinders of the first cylinder group 22 of the engine 20.

The engine 20 outputs exhaust gas to the primary exhaust system 60 via separate fluid passageways from the exhaust ducts 22b, 24b of the first and second cylinder groups 22, 24. The primary exhaust system 60 directs the exhaust flow out of the engine 20. The primary exhaust system 60 may include one or more turbines 62, 64, 66. One or more of the turbines, e.g., first and second main turbines 62, 64, may be connected in a series relationship, as shown in FIGS. 1-3. It is contemplated that the primary exhaust system 60 may include additional components such as, e.g., emission controlling devices (e.g., particulate filters, regeneration devices, particulate traps, nitrogen oxide (NOx) adsorbers, other catalytic devices, and the like), attenuation devices, or other measures for directing exhaust flow out of engine 20, that are known in the art.

As shown in FIGS. 1-3, the exhaust manifold 28 is connected to the exhaust ducts 22b of the first cylinder group 22 and directs the exhaust gas from the first cylinder group 22 to the second main turbine 64, which is connected in a series relationship to the first main turbine 62, via a fluid passageway. The exhaust duct 24b of the second cylinder group 24 is connected to the third turbine 66 (or "recirculation turbine") via a separate fluid passageway.

The first main compressor 42 and the first main turbine 62 are coupled to form a first main turbocharger 12, the second main compressor 44 and the second main turbine 64 are coupled to form a second main turbocharger 14, and a third compressor 86 (or "recirculation compressor") of the secondary exhaust system 80 (described below) is coupled to the third turbine 66 to form a third turbocharger 16 (or "recirculation turbocharger").

Each turbine 62, 64, 66 is configured to drive the connected compressors 42, 44, 86. As the hot exhaust gases exiting the engine 20 expand against blades (not shown) of the turbines 62, 64, 66, the turbines 62, 64, 66 rotate and drive the connected compressors 42, 44, 86. It is contemplated that the first and second main turbines 62, 64 may be replaced by a single main turbine in the primary exhaust system 60. It is also contemplated that the turbines 62, 64, 66 may be omitted and the compressors 42, 44, 86 may be driven by the engine 20 mechanically, hydraulically, electrically, or in any other manner known in the art, if desired.

As yet another alternative, the first and second main turbochargers 12, 14 may be replaced by a single main turbocharger (e.g., the first main turbocharger 12) including a main compressor (e.g., the first main compressor 42) and a main turbine (e.g., the first main turbine 62) and a fourth turbine (not shown) to form a turbocompounding system. The fourth turbine is fluidly connected to the outlet of the main turbine via a fluid passageway. In such a system, the fourth turbine is positioned downstream of the main turbine to receive the exhaust gas exiting the main turbine. The fourth turbine recovers energy from the exhaust gas flow and uses the energy to operate the engine, e.g., to rotate a crankshaft in the engine (not shown).

The secondary exhaust system 80 allows the recirculation of at least a portion of the exhaust flow from the primary exhaust system 60 back to the engine 20. For example, the secondary exhaust system 80 may include an aftertreatment system 82, an inlet port 83, a cooler 84, and the third compressor 86. It is contemplated that the secondary exhaust system 80 may also include additional components, such as a catalyst, an electrostatic precipitation device, a shield gas system, any other ways of redirecting, and the like, that are known in the art.

As shown in FIGS. 1-3, the aftertreatment system 82 is connected to the outputs of the third turbine 66 and the first turbine 62 via separate fluid passageways. For example, in the exemplary embodiment shown in FIG. 1, the filter 82a and catalyst 82b of the aftertreatment system 82 are disposed downstream of the first and third turbines 62, 66 to receive the exhaust gases from the turbines 62, 66. In the exemplary embodiment shown in FIG. 2, the filter 82a is disposed downstream from the first turbine 62 and the catalyst 82b is disposed downstream from the filter 82a and the third turbine 66.

The aftertreatment system 82 is configured to remove particulates and other pollutants from the exhaust flow to output so-called "clean" exhaust gas, e.g., exhaust gas with a reduced amount of particulates. The aftertreatment system 82 of the exemplary embodiment includes a filter 82a and may also include a catalyst for reducing an ignition temperature of the particulate matter trapped by the filter (not shown), a system for regenerating the particulate matter trapped by the filter (not shown), or both a catalyst and a capability for regenerating (not shown).

The aftertreatment system 82 may also include a catalyst 82b for removing pollutants such as NOx from the exhaust gas by chemical reaction. In an exemplary embodiment, the catalyst 82b is a NOx reducing catalyst, such as a selective catalytic reduction ("SCR") catalyst, that provides catalytic reduction of NOx in the exhaust gas using ammonia. The NOx reducing catalyst 82b facilitates a reaction between ammonia and NOx to produce water and nitrogen gas, thereby removing NOx from the exhaust gas.

Ammonia used in this catalytic reaction in the aftertreatment system 82 may be produced "on-board," i.e., as needed in real time, or may be stored in a refillable storage container, such as a tank, and supplied to the NOx reducing catalyst 82b when needed. In the exemplary embodiment, the ammonia is produced on-board by operating the second cylinder group 24 differently than the first cylinder group 22.

In the exemplary embodiment, the operating conditions in the first cylinder group 22 are different from the operating conditions in the second cylinder group 24. Specifically, the first cylinder group 22 is operated with a lean fuel-to-air ratio, i.e., a fuel-to-air ratio of less than 1.0, and the second cylinder group 24 is operated with a near stoichiometric fuel-to-air ratio, i.e., a fuel-to-air ratio of 1.0 or approximately 1.0. As a result, the second cylinder group 24 produces an increased amount of NOx compared to the first cylinder group 22. The throttle valve 50 regulates the intake of the compressed intake air to the second cylinder group 24 to ensure the proper fuel-to-air ratio.

Fuel may be supplied to this NOx-containing exhaust gas from the second cylinder group 24 to produce a fuel rich, NOx-containing exhaust gas. In the exemplary embodiment shown in FIG. 1, a fuel supply device 70 is provided downstream from the exhaust duct 24b of the second cylinder group 24 in the fluid passageway connecting the exhaust duct 24b and the third turbine 66. The fuel supply device 70 is configured to supply fuel into the exhaust duct 24b from the cylinder in the second cylinder group 24, thereby making the exhaust stream rich. Thus, the exhaust gas stream may be lean upstream of the fuel supply device 70 and rich downstream of the fuel supply device 70.

The engine 20 of the exemplary embodiment shown in FIG. 1 also includes an ammonia-producing catalyst 72 downstream from the fuel supply device 70 in the fluid passageway connecting the exhaust duct 24b and the third turbine 66. The ammonia-producing catalyst 72 is configured to convert at least a portion of the NOx in the NOx-containing exhaust gas from the second cylinder group 24 into ammonia. The ammonia may be produced by a reaction between NOx and other substances in the NOx-containing exhaust gas from the second cylinder group 24. For example, NOx may react with a variety of other combustion byproducts to produce ammonia. These other combustion byproducts may include, for example, $H_2$ (hydrogen gas), $C_3H_6$ (propene), or CO (carbon monoxide).

The ammonia-producing catalyst 72 may be made from a variety of materials. In one embodiment, the ammonia-producing catalyst 72 may include at least one of platinum, palladium, rhodium, iridium, copper, chrome, vanadium, titanium, iron, or cesium. Combinations of these materials may be used, and the catalyst material may be chosen based on the type of fuel used, the fuel-vapor to air ratio desired, or for conformity with environmental standards.

Alternatively, the fuel supply device 70 and/or the ammonia-producing catalyst 72 may be positioned in the exhaust duct 24b of the second cylinder group 24 or in the aftertreatment system 82.

Alternatively, in the exemplary embodiment shown in FIG. 2, the fuel supply device 70 and the ammonia-producing catalyst 72 are positioned in the fluid passageway connecting the third turbine 66 to the aftertreatment system 82. In this embodiment, the temperature of the NOx-containing exhaust gas from the second cylinder group 24 decreases after it exits the exhaust duct 24b and passes through the third turbine 66. The temperature of the exhaust gas is at a more favorable lower temperature before reaching the fuel supply device 70 and the ammonia-producing catalyst 72, thereby allowing the ammonia-producing catalyst 72 to be more effective.

In an alternate embodiment, the second cylinder group 24 may operate under lean conditions and not under stoichiometric conditions, for example, when on-board ammonia production is not necessary. In this embodiment, the second cylinder group 24 still supplies exhaust gas to the third turbine 66, which in turn drives the third compressor 86 that pressurizes the clean exhaust gas supplied to the intake manifold 26 of the engine 20.

In the exemplary embodiment shown in FIG. 1, the inlet port 83 of the secondary exhaust system 80 is disposed downstream of the aftertreatment system 82, which includes the filter 82a and the catalyst 82b, and is fluidly connected via a fluid passageway to the aftertreatment system 82 to receive the clean exhaust gas. The inlet port 83 is configured to allow at least a portion of the clean exhaust flow from the aftertreatment system 82 to recirculate back to the intake manifold 26 of the engine 20. The remaining portion of the clean exhaust flow that is not sent through the inlet port 83 to be recirculated may be output from the exhaust recirculation system 10, e.g., released to the surrounding atmosphere as exhaust.

Alternatively, in the exemplary embodiment shown in FIG. 2, the inlet port 83 is disposed downstream from the filter 82a and upstream from the catalyst 82b in the aftertreatment system 82. The inlet port 83 is fluidly connected to the filter 82a to receive the clean exhaust gas and is configured to allow at least a portion of the clean exhaust flow from the filter 82a to recirculate back to the intake manifold 26 while the remaining portion of the clean exhaust gas that is not recirculated flows to the catalyst 82b in the aftertreatment device 82 and then output from the exhaust recirculation system 10.

The cooler 84 may be fluidly connected to the inlet port 83 via a fluid passageway, as shown in FIGS. 1-3, and configured to cool the portion of the clean recirculated exhaust gas flowing through inlet port 83. The cooler 84 may include a liquid-to-air heat exchanger, an air-to-air heat exchanger, or any other type of heat exchanger known in the art for cooling an exhaust flow.

The output from the cooler 84 may be fluidly connected to the third compressor 86 via a fluid passageway. The third compressor 86 is configured to compress the clean recirculated exhaust gas to a predetermined pressure level. The third compressor 86 may be a fixed geometry compressor, a variable geometry compressor, or any other type of compressor known in the art.

The output of the third compressor 86 is fluidly connected to the venturi 52 in the air induction system 40 via a fluid passageway. The venturi 52 allows compressed clean recirculated exhaust gas from the third compressor 86 to mix with the compressed air from the main compressors 42, 44, which is cooled by the after-cooler 48.

Optionally, one or more additional valves (not shown) may be provided in the exhaust recirculation system 10, e.g., fluidly connected to the inlet port 83 and/or the cooler 84 and configured to regulate the flow of clean exhaust flowing through the secondary exhaust system 80. Examples of the valves provided in the exhaust recirculation system 10 include a spool valve, a shutter valve, a butterfly valve, a check valve, a diaphragm valve, a gate valve, a shuttle valve, a ball valve, a globe valve, or any other valve known in the art. The valve may be solenoid-actuated, hydraulically-actuated, pneumatically-actuated, or actuated in any other manner.

INDUSTRIAL APPLICABILITY

The disclosed exhaust recirculation system may be applicable to any powered system that includes a power source that produces exhaust, such as an engine. The disclosed exhaust recirculation system may allow recovery of exhaust energy from a second cylinder group that may otherwise be wasted and may use the recovered energy to send clean recirculated exhaust gas back to an intake of the power source. The disclosed exhaust recirculation system may also allow on-board production of ammonia for use in NOx emission reduction and may reduce the number of components that are subject to the risk of corrosion by exposure to sulfuric acid. The operation of the exhaust recirculation system will now be explained.

The first main compressor 42 of the first main turbocharger 12 receives fresh air. The first main compressor 42, which is driven by the exhaust gas propelled first main turbine 62, pressurizes the air and sends the compressed air to the second main compressor 44. Alternatively, as shown in the embodiment of FIG. 3, the pressurized air may be sent to the intercooler 47 and is cooled and then sent to the second main compressor 44.

The second main compressor 44 of the second main turbocharger 14 is driven by the exhaust gas propelled second main turbine 64, pressurizes the compressed air from the first main compressor 42, and sends the compressed air to the precooler 46. The precooler 46 cools the air and then the air flows to the after-cooler 48, which cools the compressed air even more. The after-cooler 48 may cool the compressed air enough to lower combustion temperatures and reduce thermal stress on the engine 20. Alternatively, as shown in the embodiment of FIG. 3, the pressurized air may be sent directly from the second main compressor 44 to the after-cooler 48.

The compressed air flows from the after-cooler 48 to the port 49 where the flow of compressed air divides so that one portion flows through the fluid passageway leading to the throttle valve 50 and the rest of the compressed air flows through the fluid passageway leading to the venturi 52.

The compressed air that flows to the venturi 52 from the port 49 is sent to the intake manifold 26 and then to the first cylinder group 22 via the intake ducts 22a. In the exemplary embodiment, the first cylinder group 22 operates under lean combustion conditions where the fuel-to-air ratio is less than 1.0. The NOx-containing exhaust gas produced by the first cylinder group 22 flows to the exhaust manifold 28 via the exhaust ducts 22b and then to the second main turbine 64 of the second main turbocharger 14. The NOx-containing exhaust gas rotates the blades in the second main turbine 64 so that the second main turbine 64 drives the second main compressor 44. The NOx-containing exhaust gas that exits the second main turbine 64 then flows to the first main turbine 62. The NOx-containing exhaust gas causes the blades of the first turbine 62 to rotate, thereby causing the first main turbine 62 to drive the first main compressor 42. After exiting the first main turbine 62, the exhaust gas flows to the aftertreatment system 82.

The compressed air supplied to the throttle valve 50 from the port 49 flows via the intake duct 24a to the second cylinder group 24, which is operated under near shoichiometric conditions to output NOx-containing exhaust gas through the exhaust duct 24b.

Fuel is supplied to this NOx-containing exhaust gas using the fuel supply device 70. The rich, NOx-containing exhaust gas from the fuel supply device 70 is sent to the ammonia-producing catalyst 72, where the NOx in the rich, NOx-containing exhaust gas reacts to form ammonia, thereby producing ammonia-containing exhaust gas. As shown in FIG. 1, the ammonia-containing exhaust gas is supplied to the third turbine 66 in the third turbocharger 16 to cause the third turbine 66 to drive the third compressor 86, thereby causing the third turbine 66 to rotate and drive the third compressor 86.

Alternatively, as shown in FIG. 2, the fuel supply device 70 and the ammonia-producing catalyst 72 may be disposed downstream from the third turbine 66 so that NOx-containing exhaust gas is supplied to the third turbine 66 in the third turbocharger 16 to cause the third turbine 66 to drive the third compressor 86. After exiting the third turbine 66, the NOx-containing exhaust gas is sent to the fuel supply device 70 and then to the ammonia-producing catalyst 72. Then, the fuel supply device 70 and ammonia-producing catalyst 72 operate as described above.

As shown in the exemplary embodiment of FIG. 1, the NOx-containing exhaust gas from the first main turbine 62 is supplied to the NOx reducing catalyst 82b in the aftertreatment system 82. Upstream from the catalyst 82b, the ammonia-containing exhaust gas from the second cylinder group 24 (via the third turbine 66, fuel supply device 70, and the ammonia-producing catalyst 72) mixes with the NOx-containing exhaust gas from the first cylinder group 22. The combined flow is sent to the NOx reducing catalyst 82b in the aftertreatment system 82. The NOx reducing catalyst 82b allows ammonia in the ammonia-containing exhaust gas to react with NOx in the exhaust gas from the first cylinder group 22 to reduce the NOx emissions from the exhaust gas.

Then, the reduced NOx exhaust gas flows to the filter 82a in the aftertreatment system 82, as shown in FIG. 1. As a result, the aftertreatment system 82 produces a flow of so-called "clean" exhaust gas, e.g., reduced-particulate exhaust gas, which also has a reduced amount of NOx. The clean exhaust gas is supplied to the inlet port 83, where a portion of the clean exhaust gas is recirculated through the secondary exhaust system 80 toward the intake manifold 26 of the engine 20, and the remaining portion of the clean exhaust gas is released from the exhaust recirculation system 10.

Alternatively, as shown in the exemplary embodiment of FIG. 2, the NOx-containing exhaust gas from the first main turbine 62 is supplied to the filter 82a in the aftertreatment system 82. The filter 82a produces a flow of clean exhaust gas, e.g., reduced-particulate exhaust gas, which still contains NOx produced from the first cylinder group 22. The clean exhaust gas is supplied to the inlet port 83 where a portion of the clean exhaust gas is sent through the secondary exhaust system 80 toward the intake manifold 26 of the engine 20. The remaining portion of the clean NOx-containing exhaust gas mixes with the ammonia-containing exhaust gas from the second cylinder group 24 (via the third turbine 66, fuel supply device 70, and the ammonia-producing catalyst 72) to reduce the NOx emissions from the exhaust gas. The reduced-NOx exhaust gas is then released from the exhaust recirculation system 10.

As a result, the aftertreatment system 82 shown in FIG. 2 produces two separate flows: one flow of clean exhaust gas, which flows through the inlet port 83 and recirculates through the secondary exhaust system 80 to the intake manifold 26 of the engine 20, and another flow of clean exhaust gas with reduced NOx, which bypasses the inlet port 83 and is released from the exhaust recirculation system 10.

The clean recirculated exhaust gas is cooled by the cooler 84 and then sent to the third compressor 86 where the clean recirculated exhaust gas is pressurized and sent to the venturi 52. In the venturi 52, the clean recirculated exhaust gas, which has been compressed by the third compressor 86, combines with compressed air sent to the venturi 52 from the after-cooler 48. When the pressure of compressed air from the main compressors 42, 44 and the after-cooler 46 is greater than the pressure of the compressed clean recirculated exhaust gas from the third compressor 86, the venturi 52 forces the clean recirculated exhaust gas into the intake manifold 26. The combined flow enters the intake manifold 26 and is supplied to the first cylinder group 22 of the engine 20.

The combined flow then recirculates through the primary exhaust system 60 and the aftertreatment system 82 of the secondary exhaust system 80. At the inlet port 83 of the secondary exhaust system 80, a portion of the recirculated clean exhaust flow is directed toward the output of the exhaust recirculation system 10 and the rest of the recirculated clean exhaust flow circulates back to the venturi 52 where it mixes with compressed air supplied to the venturi 52 from the after-cooler 48, as described above.

Thus, a recirculation loop is provided and includes the intake manifold 26 and the first cylinder group 22 of the engine 20, the second main turbine 64, the first main turbine 62, the aftertreatment system 82, the inlet port 83, the cooler 84, the third compressor 86, and the venturi 52. Compressed intake air from the air induction system 40 is supplied continuously to the recirculation loop via the venturi 52 while a portion of the clean exhaust gas that is not recirculated via the inlet port 83 in the secondary exhaust system 80 is removed continuously from the recirculation loop.

Since clean and cooled exhaust gas recirculates to the intake of the engine 20 using the secondary exhaust system 80, this exhaust recirculation system 10 is also known as a clean and cooled exhaust gas recirculation ("clean and cooled EGR") system. As a result, carbon particles and other pollutants contained in the exhaust gas are prevented from recirculating and being introduced into the engine 20. The exhaust gas recirculation system, therefore, protects the engine 20 against problems caused by inhalation or intake of these carbon particles and other pollutants.

In the exemplary embodiment, the exhaust recirculation system 10 includes a high pressure loop. After the exhaust gas leaves the first and second cylinder groups 22, 24 of the engine 20 and is sent through the turbines 62, 64, 66 and the aftertreatment system 82, the recirculated clean exhaust gas is pressurized by the third compressor 86. The pressurized and recirculated clean exhaust gas merges with the air that has been pressurized by the first and second main compressors 42, 44. The merged pressurized gases are supplied to the intake manifold 26 of the engine 20, thereby completing the high pressure loop.

An exhaust recirculation system in accordance with the exemplary embodiment may include an engine with separate cylinder groups. In the exemplary embodiments shown in FIGS. 1-3, the energy recuperated from the first cylinder group 22 may be used separately from the energy recuperated from the second cylinder group 24. For example, the energy from the first cylinder group 22 may be recuperated and used by at least one main turbocharger to pressurize the fresh air received by the intake.

An exhaust recirculation system in accordance with the exemplary embodiment may include a recirculation turbocharger that recuperates energy from a second cylinder group. In the exemplary embodiments shown in FIGS. 1-3, the recirculation turbocharger 16 uses the recuperated energy to pressurize the clean recirculated exhaust gas and send the pressurized and recirculated clean exhaust gas to the intake manifold 26 of the engine 20.

An exhaust recirculation system in accordance with the exemplary embodiment may include two separate cylinder groups that operate under different combustion conditions. For example, in the exemplary embodiment, the second cylinder group 24 operates under near stoichiometric conditions to produce ammonia, thereby allowing on-board ammonia production. The ammonia-containing exhaust gas may be supplied to the NOx reducing catalyst 82b for reducing the amount of NOx in the exhaust gas from the first cylinder group 22. A separate tank for storing ammonia or urea is not necessary since ammonia is produced while the engine 20 is running.

An exhaust recirculation system in accordance with the exemplary embodiments may include fewer components that are vulnerable to corrosion. For example, in the exemplary embodiments shown in FIGS. 1-3, the third compressor 86 of the third turbocharger 16 pumps the clean recirculated exhaust gas through the secondary exhaust system 80 to the intake manifold 26 of the engine 20 without passing the pressurized gas through an after-cooler. The components of the secondary exhaust system 80 are less likely to corrode. The durability and efficiency of the system is increased and the components of the secondary exhaust system 80 are less susceptible to corrosion.

An exhaust recirculation system in accordance with the exemplary embodiments may include a compressor in the secondary exhaust system for sending compressed recirculated exhaust gas to the engine intake directly. In the exemplary embodiments shown in FIGS. 1-3, a separate third compressor 86 is provided for compressing the clean exhaust gas instead of sending the clean exhaust gas to the first or second compressors 42, 44 to compress the exhaust gas. Thus, the exhaust gas does not flow through the first or second compressors 42, 44, the precooler 46, or the after-cooler 48, and these components are less likely to corrode since these components are not exposed to any of the substances in the exhaust gas that, when cooled and compressed, may form sulfuric acid. The durability and efficiency of the first and second turbochargers 12, 14, the precooler 46, and the aftercooler 48 maintained.

At the same time, cooled and compressed air is supplied to the first and second cylinder groups 22, 24 using the aftercooler 48. As a result, the ammonia-producing catalyst 72 may also be held at a lower temperature, which may allow the ammonia-producing catalyst 72 to function more efficiently.

An exhaust recirculation system in accordance with the exemplary embodiments may include a venturi in an air induction system to combine compressed recirculated exhaust gas and compressed air supplied to an engine. In the exemplary embodiments shown in FIGS. 1-3, the venturi 52 helps to force the compressed clean recirculated exhaust gas into the intake manifold 26, thereby increasing engine efficiency.

An exhaust recirculation system in accordance with the exemplary embodiments may include an aftertreatment system including a filter for removing particulates to produce clean exhaust gas. The clean exhaust gas may recirculate in the exemplary exhaust recirculation system 10 until released via the inlet port 83. Each time the recirculated gas passes through the aftertreatment system 82, which includes the filter 82a, the NOx reducing catalyst 82b, and/or one or more other aftertreatment components, particulates, NOx, and/or other pollutants may be removed from the gas.

It will be apparent to those skilled in the art that various modifications and variations can be made to the exhaust recirculation system. Other embodiments will be apparent to those skilled in the art from consideration of the specification and practice of the disclosed exhaust recirculation system. It is intended that the specification and examples be considered as exemplary only, with a true scope being indicated by the following claims and their equivalents.

What is claimed is:

1. A method for recirculating exhaust gas comprising:
operating a power source including at least one first cylinder and at least one second cylinder, the first and second cylinders outputting exhaust gas;
reducing an amount of particulates from the exhaust gas using a first aftertreatment device;
compressing at least a portion of the exhaust gas;
sending a first flow including the compressed reduced-particulate exhaust gas through a first intake duct of the at least one first cylinder; and
sending a second flow through a second intake duct of the at least one second cylinder, a characteristic of the second flow passing through the second intake duct being different from a characteristic of the first flow passing through the first intake duct.

2. The method of claim 1, further including:
compressing intake air; and
sending the compressed intake air to at least one of the intake ducts of the first and second cylinders.

3. The method of claim 2, wherein substantially all of the second flow is directed from an intake and includes the compressed intake air, and the first flow includes the compressed intake air and the compressed reduced-particulate exhaust gas.

4. The method of claim 1, further including:
producing exhaust gas including NOx in the at least one first cylinder;
converting at least a portion of exhaust gas from the at least one second cylinder into ammonia; and combining the exhaust gas including NOx from the at least one first cylinder with the exhaust gas including ammonia from the at least one second cylinder.

5. The method of claim 4, further including reacting the combined exhaust flow with a NOx reducing catalyst.

6. The method of claim 4, further including operating the at least one second cylinder with a near stoichiometric fuel-to-air ratio, and the converting of the at least a portion of the exhaust gas from the at least one second cylinder into ammonia includes reacting the exhaust gas from the at least one second cylinder using an ammonia-producing catalyst.

7. The method of claim 2, further including cooling the compressed intake air before the sending of the compressed intake air to the at least one of the intake ducts of the first and second cylinders.

8. The method of claim 1, wherein the first aftertreatment device includes at least one of a particulate filter, a regeneration device, and a particulate trap.

9. An exhaust recirculation system comprising:
a power source including at least one cylinder outputting exhaust gas;
a particulate reducing device fluidly connected to at least one exhaust duct of the power source, the particulate reducing device being configured to reduce an amount of particulates in the exhaust gas;
a recirculation compressor configured to receive and compress a flow including at least a portion of the exhaust gas, substantially all of the flow compressed by the recirculation compressor being directed from the power source; and
an intake duct of the at least one cylinder of the power source being fluidly connected to the recirculation compressor to receive the compressed reduced-particulate exhaust gas.

10. The exhaust recirculation system of claim 9, wherein:
the at least one cylinder of the power source includes at least one first cylinder and at least one second cylinder;
a first intake duct of the at least one first cylinder is configured to receive a first flow including the compressed reduced-particulate exhaust gas; and
a second intake duct of the at least one second cylinder is configured to receive a second flow having a characteristic different than a characteristic of the first flow.

11. The exhaust recirculation system of claim 10, further including a recirculation turbocharger including the recirculation compressor and a recirculation turbine driving the recirculation compressor, the recirculation turbine being propelled by exhaust gas, substantially all of the exhaust gas propelling the recirculation turbine being directed from the at least one second cylinder.

12. The exhaust recirculation system of claim 10, further including at least one main compressor for compressing a flow including intake air supplied to the power source, substantially all of the flow compressed by the at least one main compressor being directed from an intake, the at least one main compressor being fluidly connected to at least one of the intake ducts of the first and second cylinders.

13. The exhaust recirculation system of claim 12, further including a main turbocharger including the at least one main compressor and at least one main turbine, each of the at least one main turbines driving the respective main compressor, the at least one main turbine being propelled by exhaust gas, substantially all of the exhaust gas propelling the at least one main turbine being directed from the at least one first cylinder.

14. The exhaust recirculation system of claim 10, further including an ammonia-producing device for converting at least a portion of the exhaust gas from the at least one second cylinder into ammonia and the at least one first cylinder produces exhaust gas including NOx.

15. The exhaust recirculation system of claim 10, wherein the at least one second cylinder is a single cylinder and the at least one first cylinder is a plurality of cylinders.

16. The exhaust recirculation system of claim 12, further including:
a combining device for combining at least a portion of the compressed intake air and the compressed exhaust gas, the combining device being fluidly connected to the at least one intake duct of the at least one first cylinder, the combining device supplying the combined compressed flow to the intake duct of the at least one first cylinder,
an after-cooler fluidly connected to an output of the at least one main compressor, the after-cooler cooling the compressed intake air, and
the combining device being directly and fluidly connected to each of the recirculation compressor and the after-cooler.

17. An exhaust recirculation system comprising:
a power source comprising at least one first cylinder and at least one second cylinder, each of the first and second cylinders outputting exhaust gas, the at least one first cylinder operating under different combustion conditions than the at least one second cylinder, the first and the second cylinders having separate intake ducts and separate exhaust ducts;
an aftertreatment device fluidly connected to at least one exhaust duct of the power source;
at least one recirculation compressor configured to receive and compress at least a portion of the exhaust gas, and
at least one recirculation turbine driving the at least one recirculation compressor and being propelled by a flow of the exhaust gas, substantially all of the flow propelling the at least one recirculation turbine being directed from the at least one second cylinder, and the intake duct of the at least one first cylinder being fluidly connected to the recirculation compressor.

18. The exhaust recirculation system of claim 17, further including an ammonia-producing device for converting at least a portion of the exhaust gas from the at least one second cylinder into ammonia, the exhaust gas from the at least one first cylinder includes NOx.

19. The method of claim 1, wherein a composition of the first flow is different than a composition of the second flow.

20. The exhaust recirculation system of claim 9, wherein at least a majority of the compressed flow is exhaust gas.

21. The exhaust recirculation system of claim 17, wherein the different combustion conditions include different fuel-to-air ratios.

22. The exhaust recirculation system of claim 17, wherein:
the flow of exhaust gas propelling the recirculation turbine is a first flow of exhaust gas; and
the exhaust recirculation system further includes at least one main turbine propelled by a second flow of exhaust gas, substantially all of the second flow propelling the at least one main turbine being directed from the at least one first cylinder.

23. A method for recirculating exhaust gas comprising:
operating a power source including at least one first cylinder and at least one second cylinder, the first and second cylinders outputting exhaust gas;
reducing an amount of particulates from the exhaust gas using a first aftertreatment device;

compressing at least a portion of the exhaust gas;

sending a first flow including the compressed reduced-particulate exhaust gas to an intake duct of the at least one first cylinder without cooling the compressed reduced-particulate exhaust gas; and cooling a second flow directed to an intake duct of the at least one second cylinder.

24. The method of claim 23, wherein the first flow includes the compressed reduced-particulate exhaust gas and compressed intake air, and substantially all of the second flow is compressed intake air.

25. The method of claim 23, wherein a characteristic of the second flow is different from a characteristic of the first flow.

26. The method of claim 1, wherein the first flow including the compressed reduced-particulate exhaust gas is sent only to the first intake duct of the at least one first cylinder.

27. The method of claim 1, wherein substantially all of the first flow including the compressed reduced-particulate exhaust gas is directed to the first intake duct of the at least one first cylinder.

28. The method of claim 1, wherein the characteristic of the first flow includes a first ratio of intake air to exhaust gas, and the characteristic of the second flow includes a second ratio of intake air to exhaust gas.

29. The exhaust recirculation system of claim 9, wherein a flow including intake air is combined with the compressed reduced-particulate exhaust gas downstream from the recirculation compressor.

30. The exhaust recirculation system of claim 9, wherein all of the flow compressed by the recirculation compressor is directed from the power source.

* * * * *